(12) United States Patent
Strong et al.

(10) Patent No.: US 8,523,203 B1
(45) Date of Patent: *Sep. 3, 2013

(54) TRAILING AXLE SUSPENSION SYSTEM

(76) Inventors: Brooks Strong, Houston, TX (US);
Joshua Cayne Fisher, Montgomery, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,346

(22) Filed: Apr. 18, 2012

(51) Int. Cl.
*B62D 61/12* (2006.01)
(52) U.S. Cl.
USPC .................................... 280/86.5; 180/24.02
(58) Field of Classification Search
CPC ..................................................... B62D 61/12
USPC .................. 180/22, 24.02, 209; 280/43.13, 280/43.17, 43.23, 81.1, 86.5
See application file for complete search history.

(56) References Cited

U.S. PATENT DOCUMENTS

| | | | | |
|---|---|---|---|---|
| 4,063,779 | A * | 12/1977 | Martin et al. | 298/22 P |
| 5,823,629 | A * | 10/1998 | Smith et al. | 298/23 R |
| 6,116,698 | A * | 9/2000 | Smith et al. | 298/23 R |
| 6,247,712 | B1 * | 6/2001 | Smith et al. | 280/86.5 |
| 7,731,208 | B2 * | 6/2010 | Strong | 280/86.5 |
| 7,740,252 | B2 * | 6/2010 | Strong | 280/86.5 |
| 7,775,308 | B2 * | 8/2010 | Strong | 180/24.02 |
| 7,775,533 | B2 * | 8/2010 | Strong | 280/86.5 |
| 7,841,604 | B2 * | 11/2010 | Mitchell | 280/86.5 |
| 2002/0020979 | A1 * | 2/2002 | Smith et al. | 280/86.5 |
| 2007/0090620 | A1 * | 4/2007 | Lee | 280/124.111 |
| 2009/0206570 | A1 * | 8/2009 | Strong | 280/86.5 |

* cited by examiner

*Primary Examiner* — Joseph Rocca
(74) *Attorney, Agent, or Firm* — Ronald L. Phillips

(57) ABSTRACT

A suspension system is disclosed that suspends a trailing axle with steerable wheels from the body of a motor vehicle with a carriage and a pair of actuators. The axle is directly suspended from the carriage and the actuators operate to establish the carriage and thereby the axle in a stowed condition on the vehicle body and in an active condition where the axle trails the vehicle at a substantial distance and is forced by the actuators to help support the vehicle. And the actuators are pivotally connected to the vehicle body at a location above the highest possible height of the center of gravity of the maximum allowable load supported by the vehicle body to thereby enhance vehicle roll stability with the trailing axle suspension system while providing for significant travel of the axle relative to the frame of the vehicle in accommodating road grade differences between the trailing axle wheels and the wheels of the primary axles normally supporting the vehicle frame and also blocking road surface produced shock forces on the trailing axle wheels from the vehicle body.

20 Claims, 15 Drawing Sheets

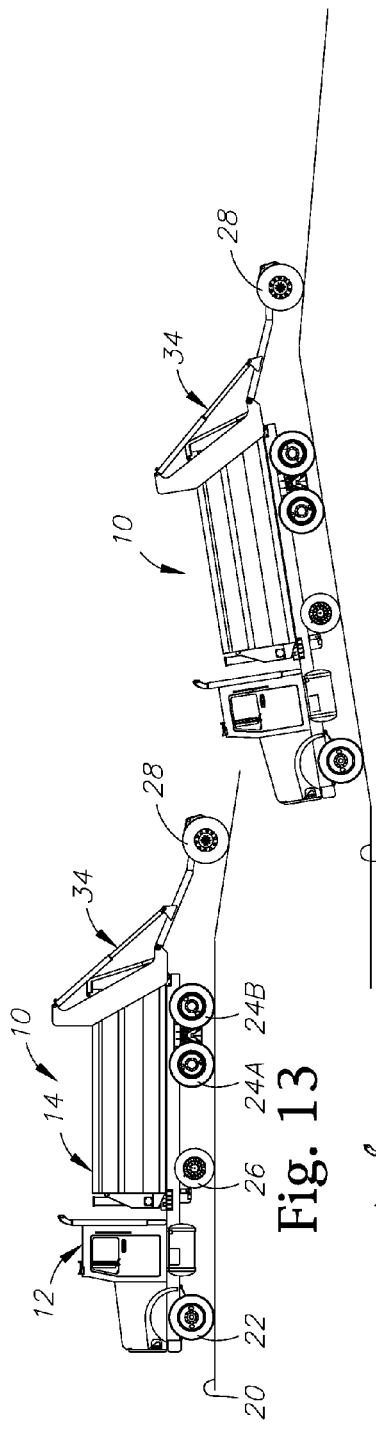
Fig. 13
Fig. 14
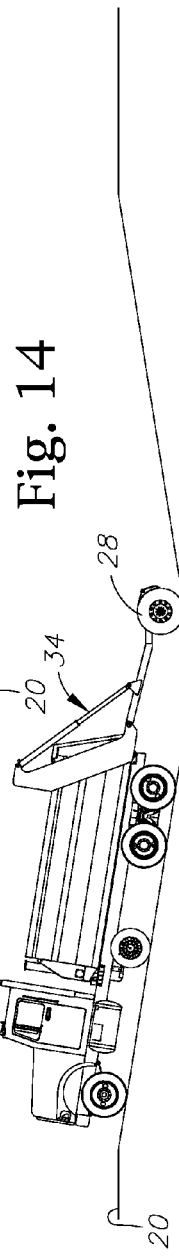
Fig. 15
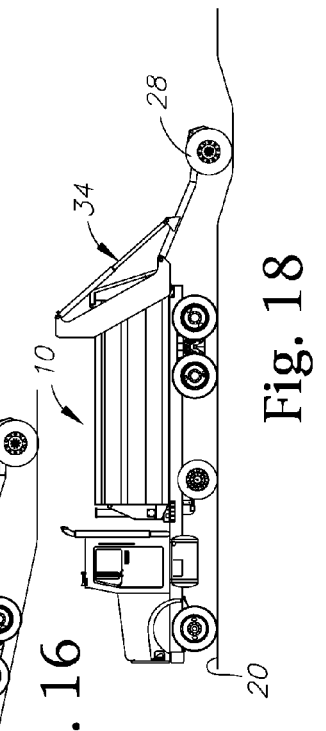
Fig. 16
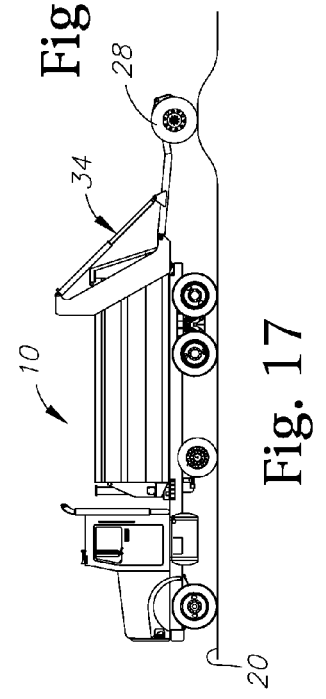
Fig. 17
Fig. 18

TRAILING AXLE SUSPENSION SYSTEM

TECHNICAL FIELD

This invention relates to trailing axle suspension systems and more particularly to those for suspending a trailing axle with steerable wheels from the body of a motor vehicle.

BACKGROUND OF THE INVENTION

In employing a deployable trailing axle with steerable wheels to extend the load capacity of a motor vehicle by reducing the loads that the other axles support, conventional practice is mainly concerned with the load distribution between all the axles supporting the vehicle and accommodating differences in road grade between the trailing axle wheels and the wheels of the vehicle's primary axles that normally support the vehicle. And also with As well as isolating shock forces on the steerable trailing axle wheels from the vehicle when the wheels encounter bumps and dips either conjointly or separately. While on the other hand, less concern is addressed to the extent to which a trailing axle suspension system can contribute to enhancing the roll stability of the vehicle. And this applies to a wide range of motor vehicles and especially payload-carrying motors such as refuse trucks, dump trucks, transit mixers and the like where a trailing axle can significantly extend the payload capacity while meeting road restrictions governing axle loading and the wheel base required of the vehicle in meeting bridge restrictions.

In addressing the matter of enhancing the vehicle roll stability with a trailing axle suspension for a payload-carrying vehicle, a major challenge is presented in providing such where the center of gravity of a load can vary significantly from a low elevation on the vehicle with little or no added load to a high elevation on the vehicle at the maximum acceptable load weight. And as a result, centripetal forces resulting from the vehicle negotiating a curve at considerable speed and crosswind forces acting on the vehicle body as well as unbalanced lateral forces acting on the vehicle frame can induce rolling/tilting of the vehicle frame to a varying degree that can be difficult to control. Especially when the center of gravity of a load is at a high elevation on the vehicle and can therefore have a large influence on vehicle frame roll resulting from centripetal forces and other forces such as high crosswinds acting to tilt the vehicle frame about its roll axis. And this can include when the vehicle is executing a quick directional change even at a relatively low speed.

However, in attempting to maximize the degree to which the trailing axle suspension system can contribute to vehicle roll stability while allowing the trailing axle to adjust to relatively large road grade differences between the trailing axle wheels and the wheels of the primary axles and blocking shock forces on the trailing axle wheels from the vehicle depends on whether the trailing axle is suspended from either the tailgate or the vehicle body or directly from the vehicle frame supporting the vehicle body. As they each present different challenges in attempting to arrive at a trailing axle suspension system that significantly contributes to vehicle roll stability without compromising other possible attributes of the trailing axle suspension system.

For example, it has been found that in the case of suspending a trailing axle with steerable wheels from the tailgate of a vehicle body that may not need to be tilted to discharge a load, there is the matter of then accommodating the axle in a suitable stowed condition without accompanying undesirable consequences. While significantly increasing the contribution of the trailing axle suspension to vehicle roll stability when the trailing axle is operating and in also isolating shock forces on the trailing axle wheels from the vehicle. On the other hand, it has been found that in the case of suspending a trailing axle with steerable wheels from a vehicle body that is tilted to discharge a load past an open tailgate, there is the matter of accommodating the axle in a suitable stowed condition while significantly increasing the contribution of the trailing axle suspension system to vehicle roll stability when the trailing axle is operating with the tailgate closed and in also isolating shock forces on the trailing axle wheels from the vehicle body. And in the case of suspending the trailing axle directly from the vehicle frame and in seeking enhanced vehicle frame roll stability with the trailing axle, there is the matter of having to add further frame structure for suspending the trailing axle clear of the vehicle body to accommodate the operation of its tailgate and regardless of whether the vehicle frame that supports the vehicle body is tilted or not to discharge a load with the tailgate open. Moreover, suspending the trailing axle from the frame normally requires significantly more lateral (anti-roll) force derived from the trailing axle via the actuators to counter the roll inducing forces on the frame.

SUMMARY OF THE INVENTION

The present invention is directed to where a trailing axle with steerable wheels is entirely suspended from the vehicle body. Wherein it was found that the vehicle roll stability can be significantly enhanced by the trailing axle suspension system in an effective manner while also providing for advantageous stowage of the axle on the vehicle body, allowing large differences in road grade between the trailing axle wheels and those of the primary axles normally supporting the vehicle and all the while preventing shock forces on the trailing axle wheels from reaching the vehicle body and thereby the vehicle frame. With these desired results provided by the present invention with a trailing axle suspension comprising a carriage from which the axle is directly suspended and a pair of actuators.

Wherein the carriage is pivotally mounted on the vehicle body in a manner providing for the axle to be positioned in a stowed condition on the vehicle body allowing the tailgate to open to discharge a load and in an active condition to help support the vehicle frame. And with the trailing axle in the active condition located a substantial distance behind the vehicle where it is forced by the actuators to help support the vehicle with its wheels.

And wherein gas springs are provided in a strategic manner to allow a wide range of movement of the trailing axle to accommodate differences in road grade between the trailing axle wheels and the wheels of the primary axles and prevent shock forces on the trailing axle wheels from being transmitted to the vehicle body. And wherein the actuators resist forced movement of the vehicle frame about its roll axis in an enhanced manner at the pivotal connections of the actuators with the vehicle body and thereby contribute to the roll stability of the vehicle. With the latter being enabled to a significant degree in a force-strategic manner by the pivotal connections of the actuators with the vehicle body being located so that the minimum possible distance in height between the trailing axle roll axis and the actuator pivotal connections with the tailgate is always greater than the maximum distance in height between the roll axis of the vehicle frame and the center of gravity of the maximum allowed load supported by the vehicle body. And thus provides for the trailing axle suspension system to counter roll inducing forces in a highly efficient manner.

These and other features and aspects of the invention will become more apparent from the accompanying drawings of an exemplary embodiment and the description thereof.

DESCRIPTION OF THE DRAWINGS

FIG. 13 is a reduced side view of the truck as shown in FIG. 4 with the truck remaining on a level portion of the road surface while the trailing axle wheels are then on an upwardly inclined portion of the road surface;

FIG. 14 is a view like FIG. 13 but with the truck on an downwardly inclined portion of the road surface while the trailing axle wheels are on an upwardly inclined portion of the road surface;

FIG. 15 is a view like FIG. 14 with the truck on an upwardly inclined portion of the road surface while the trailing axle wheels are then on a downwardly inclined portion of the road surface;

FIG. 16 is a view like FIG. 15 with the truck on an upwardly inclined portion of the road surface while the trailing axle wheels are then on a level portion of the road surface;

FIG. 17 is a reduced side view of the truck as shown FIG. 4 but with the trailing axle wheels encountering a bump in the road surface;

FIG. 18 is a view like FIG. 17 but with the trailing axle wheels encountering a dip in the road surface;

DESCRIPTION OF AN EXEMPLARY EMBODIMENT

Figure 1:
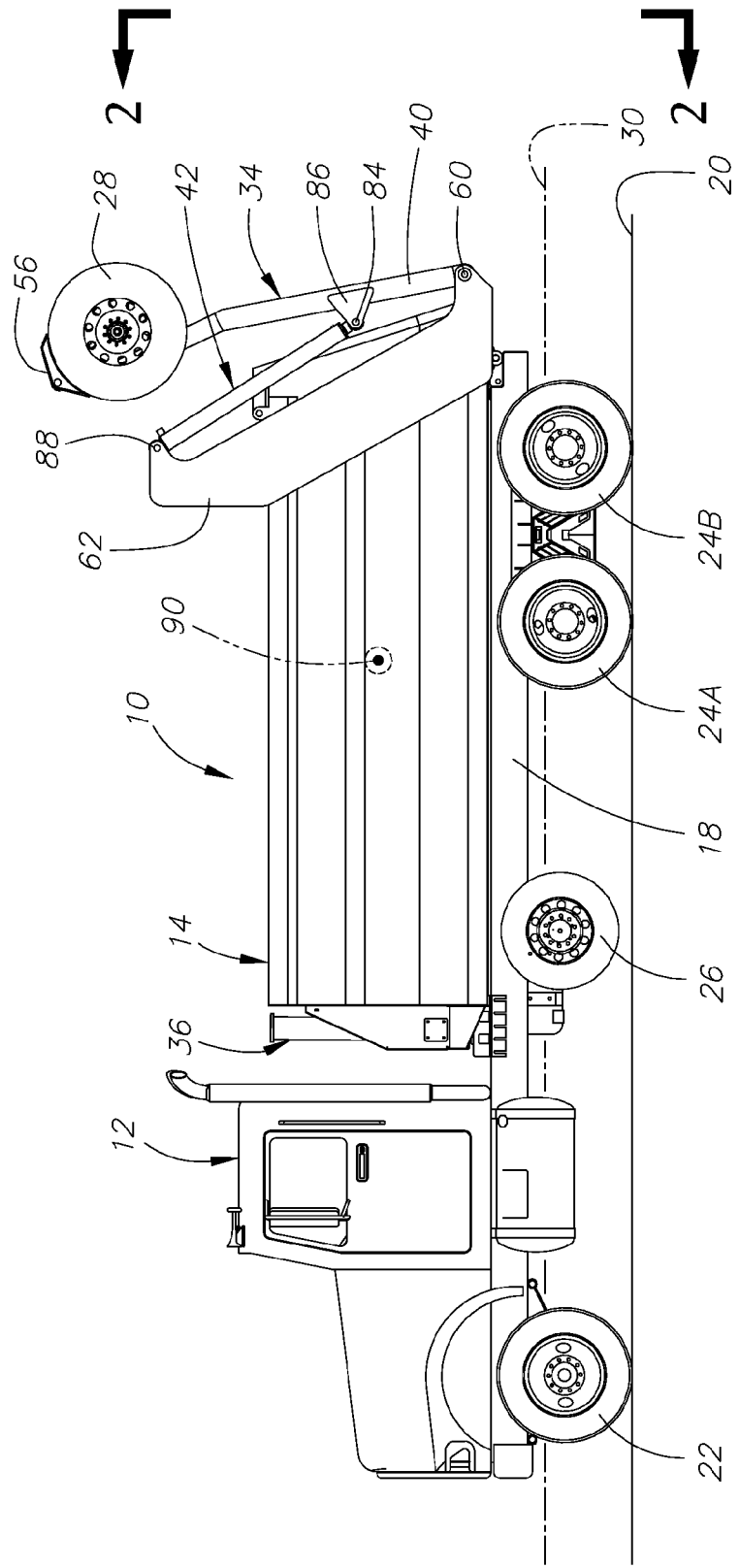
FIG. 1 is a side view of a dump truck embodying the present invention wherein the trailing axle is shown in its stowed condition.

The present invention is disclosed as embodied in a payload-carrying motor vehicle in the form of a heavy-duty dump truck 10 having a cab 12 that serves as a vehicle operator and passenger compartment and a truck body 14 that serves as a payload container. Wherein the truck body 14 is open at the top for receiving a load and has a tailgate 16 that swings open when unlatched and the vehicle body is tilted to allow dumping a load. With the cab 12 and the truck body 14 mounted on a frame 18 and the frame in turn normally supported on a road surface 20 by steerable front wheels 22 located under the cab 12 and driven tandem-arranged rear wheels 24A, 24B located under the truck body 14 which are associated with the primary axles of the vehicle. And to increase the load capacity of the truck, the truck has deployable auxiliary wheels 26 commonly referred to as pusher wheels that are located between the front wheels 22 and driven rear wheels 24A, 24B and under a forward portion of the truck body 14. And to further increase the truck's load capacity, the truck is provided with deployable auxiliary wheels 28 that on deployment operate at a significant distance rearward of the truck frame and are commonly referred to as trailing wheels.

All of the wheels are of a convention type with pneumatic tires and have vehicle operator controlled service brakes of a suitable conventional type. And it will also be understood that the axles on which the front wheels 22, rear driven wheels 24A, 24B and pusher wheels 26 are mounted are suspended from laterally spaced locations on the frame 18 by conventional suspension systems. Wherein the front axle and rear driven axle suspension systems serving the primary axles are of the type employing steel springs and establish a roll axis 30 about which the frame 18 and thus the cab 12 and truck body 14 can tilt/roll to a limited degree in a cushioned/sprung manner.

Figure 4:
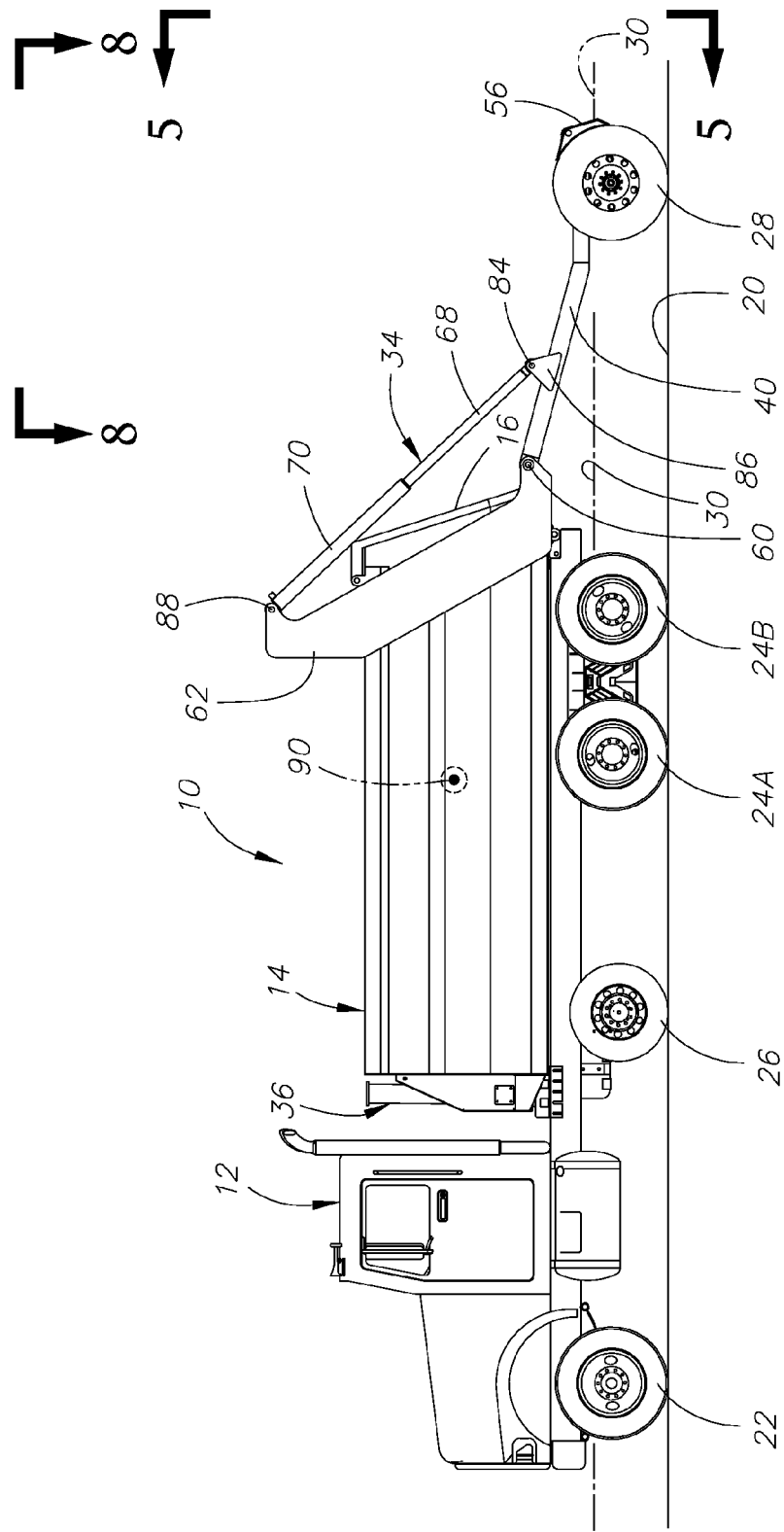
FIG. 4 is a view like FIG. 1 but showing the pusher axle wheels and the trailing axle wheels in their deployed active condition.

Whereas the pusher axle suspension system employs gas springs and the pusher wheels 26 are deployable on vehicle operator command from a stowed condition shown in FIG. 1 where they do not contact with a road surface to an active condition as shown in FIG. 4 where they are forced to contact with the road surface and thereby assist in supporting the vehicle frame to a certain degree and also in a cushioned/sprung manner. And whereas the trailing wheels 28 are also deployable on vehicle operator command to assist in supporting the vehicle frame and are mounted in a steerable manner on a trailing axle 32 that is suspended entirely from the truck body 14 by a trailing axle suspension system 34 according to the present invention.

Figure 9:
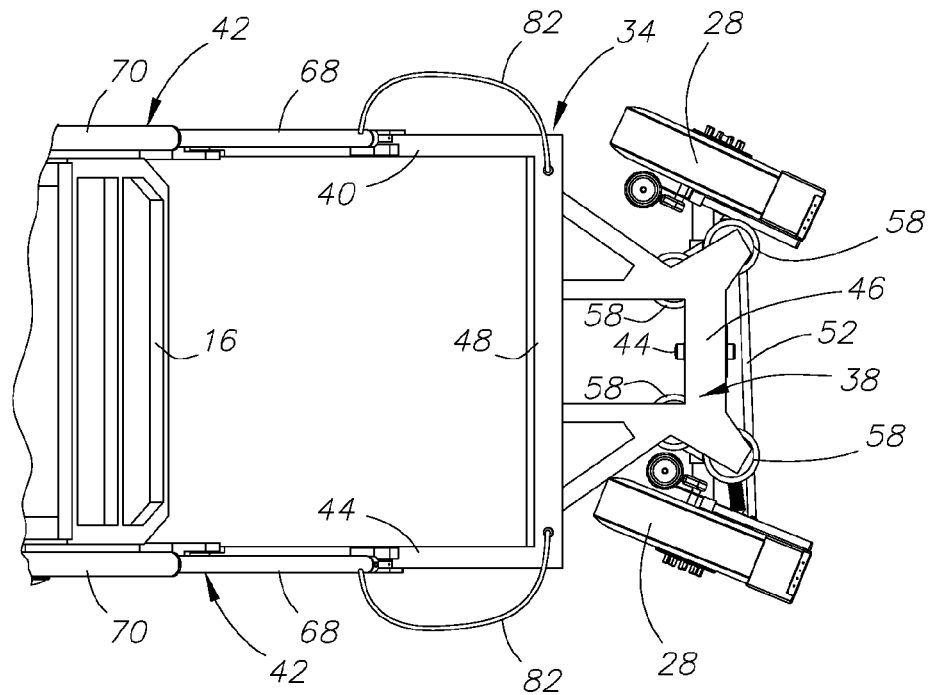
FIG. 9 is a view like Figure but showing the trailing axle's steerable wheels at their other maximum steering angle.

Continuing on with the other truck components as well as the trailing axle suspension system 34, the truck body 14 is tilted for dumping a load by being hinged at its lower rear end to the vehicle frame 18 and the provision of a vehicle operator controlled hydraulic cylinder 36 operatively arranged in a conventional manner between the vehicle frame and the front end of the truck body. See FIG. 9. Whereby the truck body 14 is tilted from a nesting position on the truck frame 18 as shown in FIG. 1 to a suitable dumping angle as shown in FIG. 9.

Figure 10:
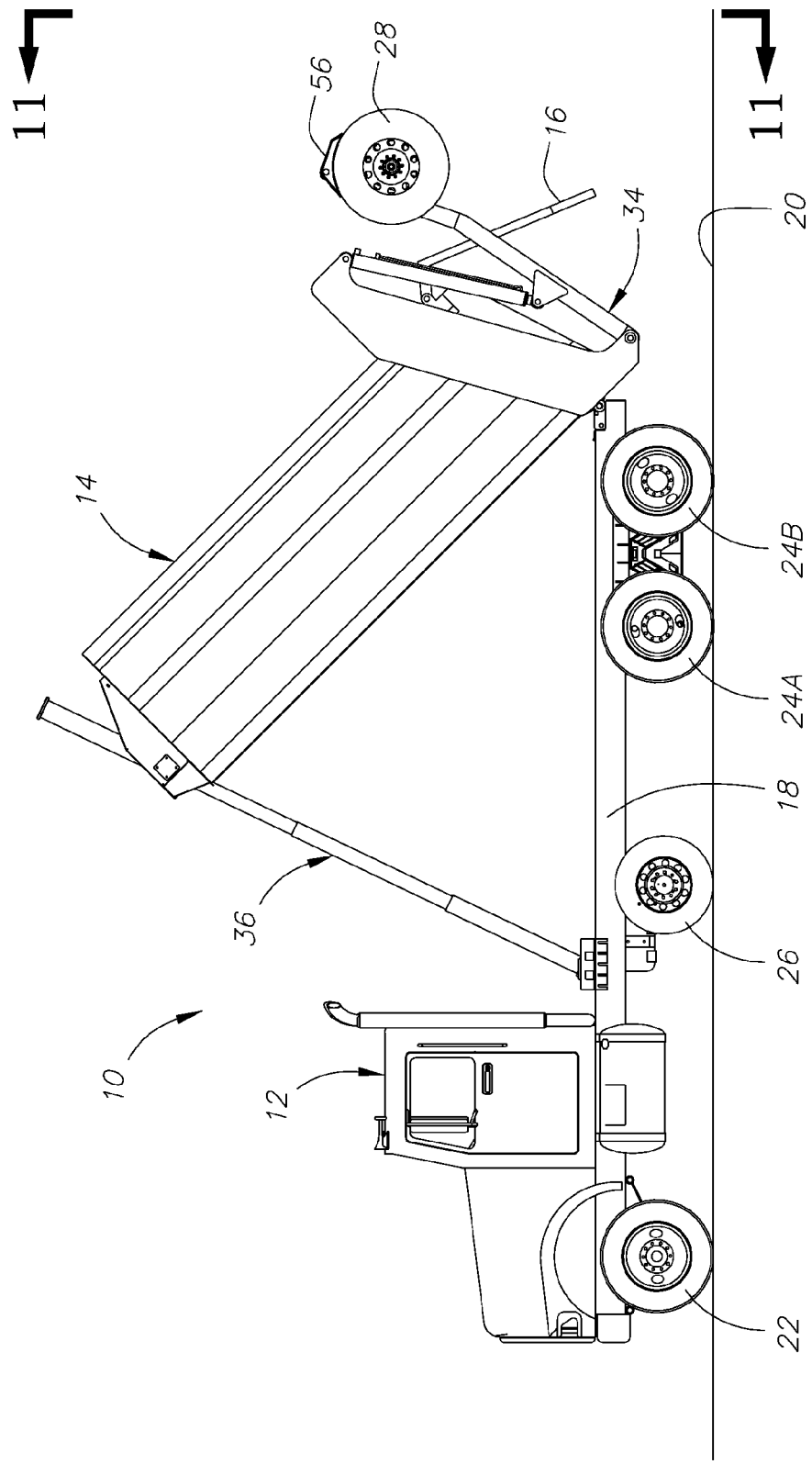
FIG. 10 is a view like FIG. 1 but showing the truck body tilted to dump a load.
Figure 11:
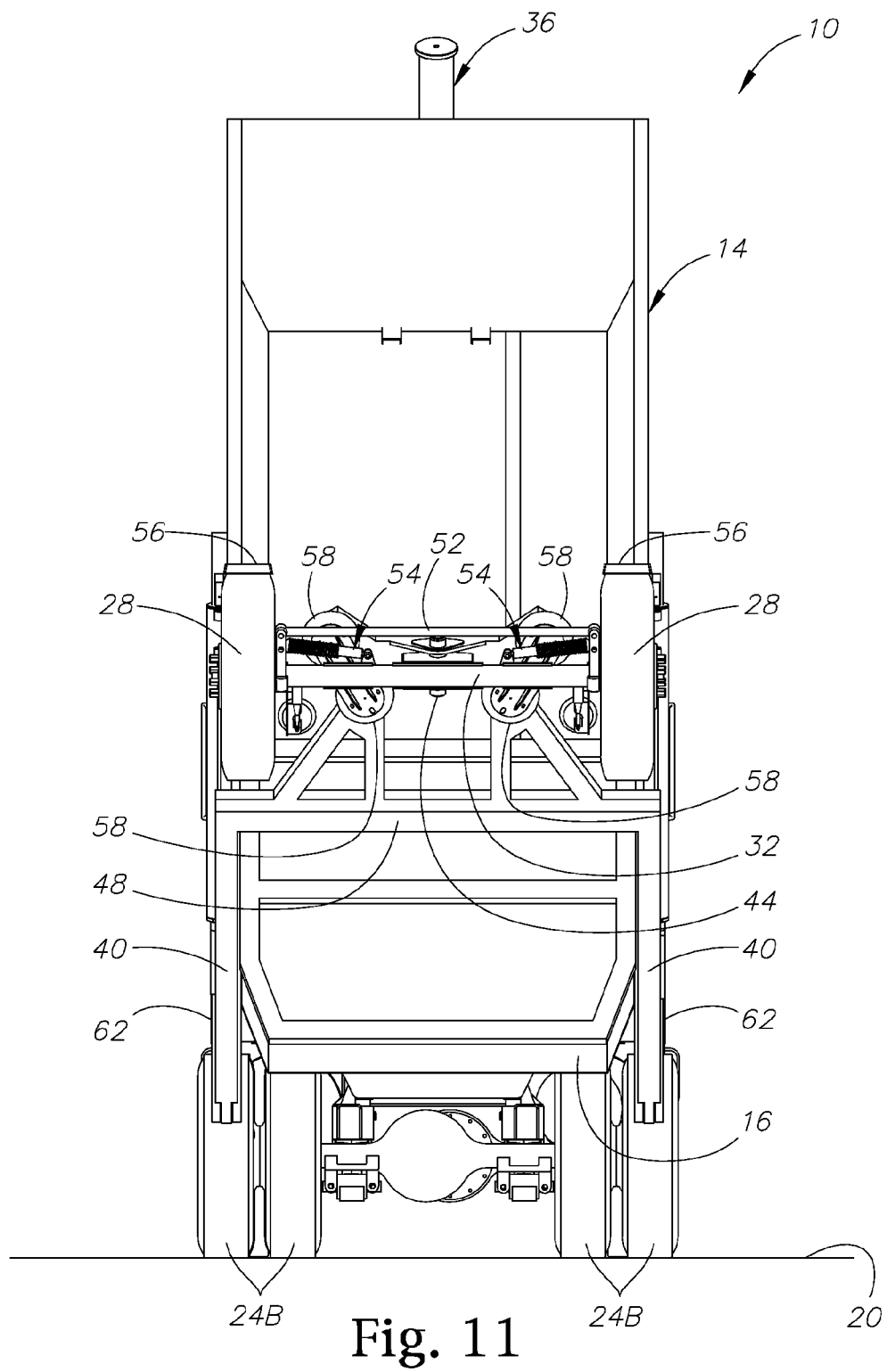
FIG. 11 is an enlarged view taken along the lines 11-11 in FIG. 10 when looking in the direction of the arrows.
Figure 12:
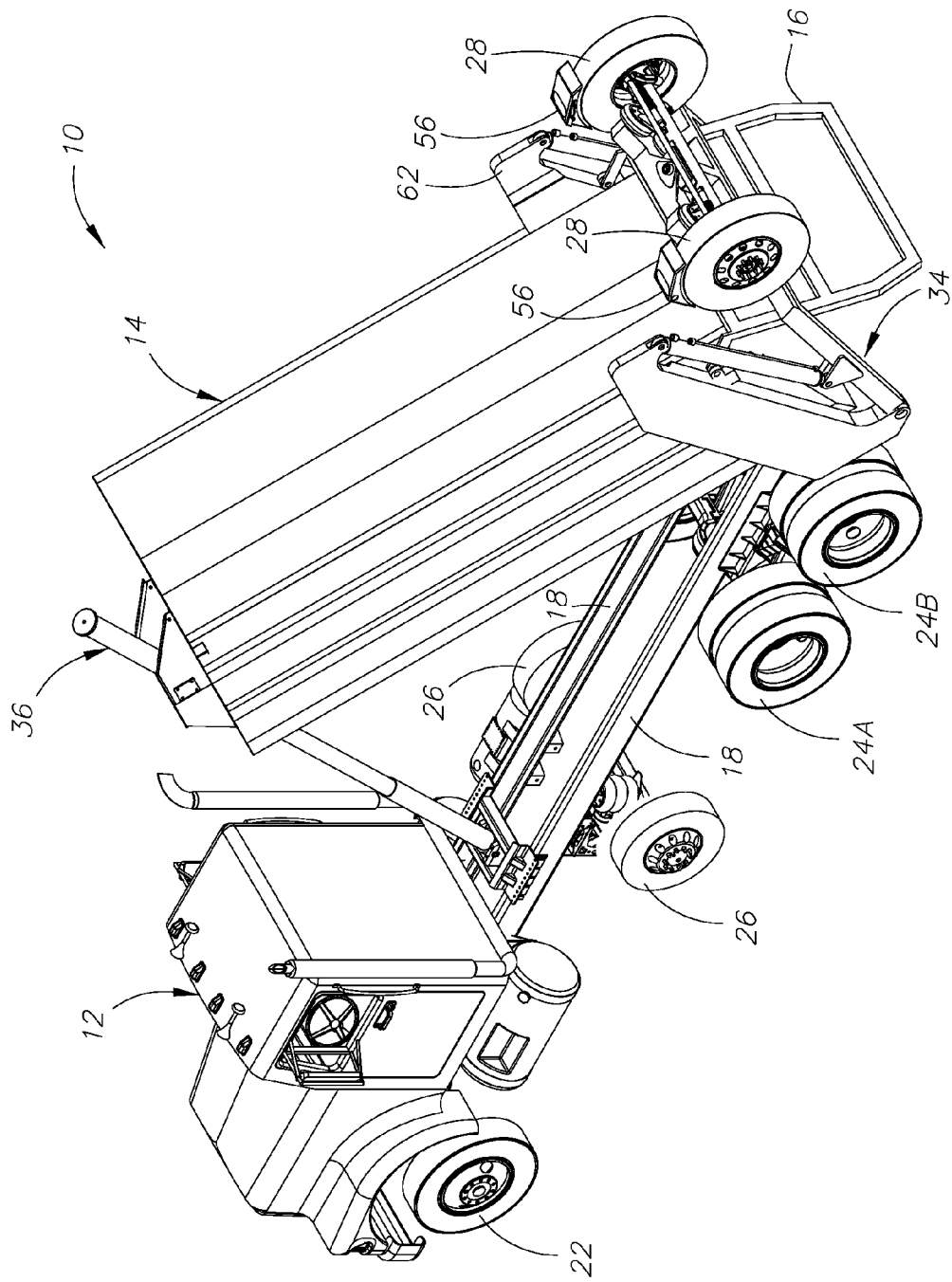
FIG. 12 is an isometric view of the truck as depicted in FIG. 10.
Figure 20:
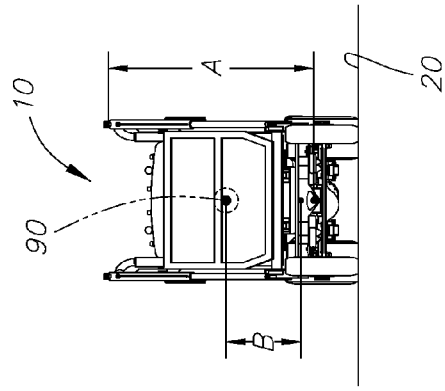
FIG. 20 is a view taken along the lines 20-20 in FIG. 19 when looking in the directions of the arrows.

Further describing the tailgate 16, it is hinged in a conventional manner at its upper end to the upper rear end of the truck body 14 which allows the tailgate to be swung from its closed position shown in FIGS. 1-9 to an open position as shown in FIGS. 10-12 by the force of gravity when the truck body is tilted to dump a load. And wherein it will be understood that the tailgate 16 is held firmly closed at its lower end by a suitable latching mechanism of a conventional type managed by the vehicle operator.

The vehicle frame and thus the cab and truck body can roll and pitch with respect to the roll axis 30 in a cushioned manner as permitted by the front axle and driven axle suspension systems and can also yaw but to a very limited extent such as with a severe change in vehicle direction. And the trailing axle suspension system 34 in addition to providing for the trailing axle 32 adding to the payload capacity and the wheelbase of the truck substantially enhances the roll stability of the truck in a strategically operational manner. Wherein a carriage 38 is provided from which the trailing axle 32 is directly suspended and the carriage has a pair of rigidly joined suspension arms 40 and together with a pair of actuators 42 suspend the trailing axle carriage and thereby the trailing axle directly from the truck body 14 and thereby from the vehicle frame 18.

The trailing axle 32 is pivotally mounted on the carriage 38 at a central location on the axle offset from the axle center-line by a pivot pin 44 to a laterally extending contoured crossmember 46 that forms the body of the carriage. Wherein the crossmember 46 is rigidly joined at laterally spaced locations to the carriage suspension arms 40 and is trussed with a crossbeam 48 that is rigidly joined at its opposite ends with the suspension arms 40 at a location that allows opening of the tailgate 16 whether the trailing axle 32 is stowed or active as further described later. With the carriage body 38 also providing for the mounting of springs that directly act on the trailing axle 36 as described later as well as serving to pivotally support the trailing axle. And with the carriage body 46 in providing such trailing axle support receives at its underside a boxed center portion 48 of the trailing axle assembly in a sandwiching manner where after the pivot pin 44 is inserted though both to complete the pivotal connection of the trailing axle with the carriage. See FIGS. 5-7 and 20.

The trailing axle wheels 28 are steered by the directional movement of the truck and for this operation are mounted in a conventional manner on the ends of the trailing axle 32 with spindles that provide a suitable camber and caster angle and have their steering arms connected by an adjustable tie rod 52 that sets the desired toe-in for the wheels. And in providing for such steering action, the trailing axle wheels 28 are stabilized and returned following their forced steerage to a normal neutral condition (zero steer angle) by their caster angle and coil spring and shock absorber assemblies 54 that are connected between the spindle steering arms and the carriage 54. See FIGS. 2 and 11. And with the trailing axle wheels being steerable, fenders 56 are provided that are mounted on the trailing axle wheel spindles so as to trail behind and thus turn conjointly with the respective wheels when the trailing axle is active. For example, see FIG. 8 that shows the trailing axle wheels 28 at one maximum steering angle in solid lines and at zero steer angle in phantom lines and FIG. 9 that shows the wheels at their opposite maximum steering angle.

With the trailing axle 32 pivotally mounted on the carriage 38 with the pivot pin 44, tilting movement of the axle relative to the carriage is resisted by four gas springs 58 of elastomeric bag construction located in pairs on opposite sides of the trailing axle pivot pin 44 and mounted between the trailing axle and the carriage. See FIGS. 5 and 7. And unlike the pusher wheel suspension system, the carriage gas springs 58 are continuously filled with air at a suitable pressure that can be increased or decreased by the vehicle operator according to the loading on the trailing axle and the degree to which they are desired to contribute to vehicle roll stability as further described later.

Figure 2:
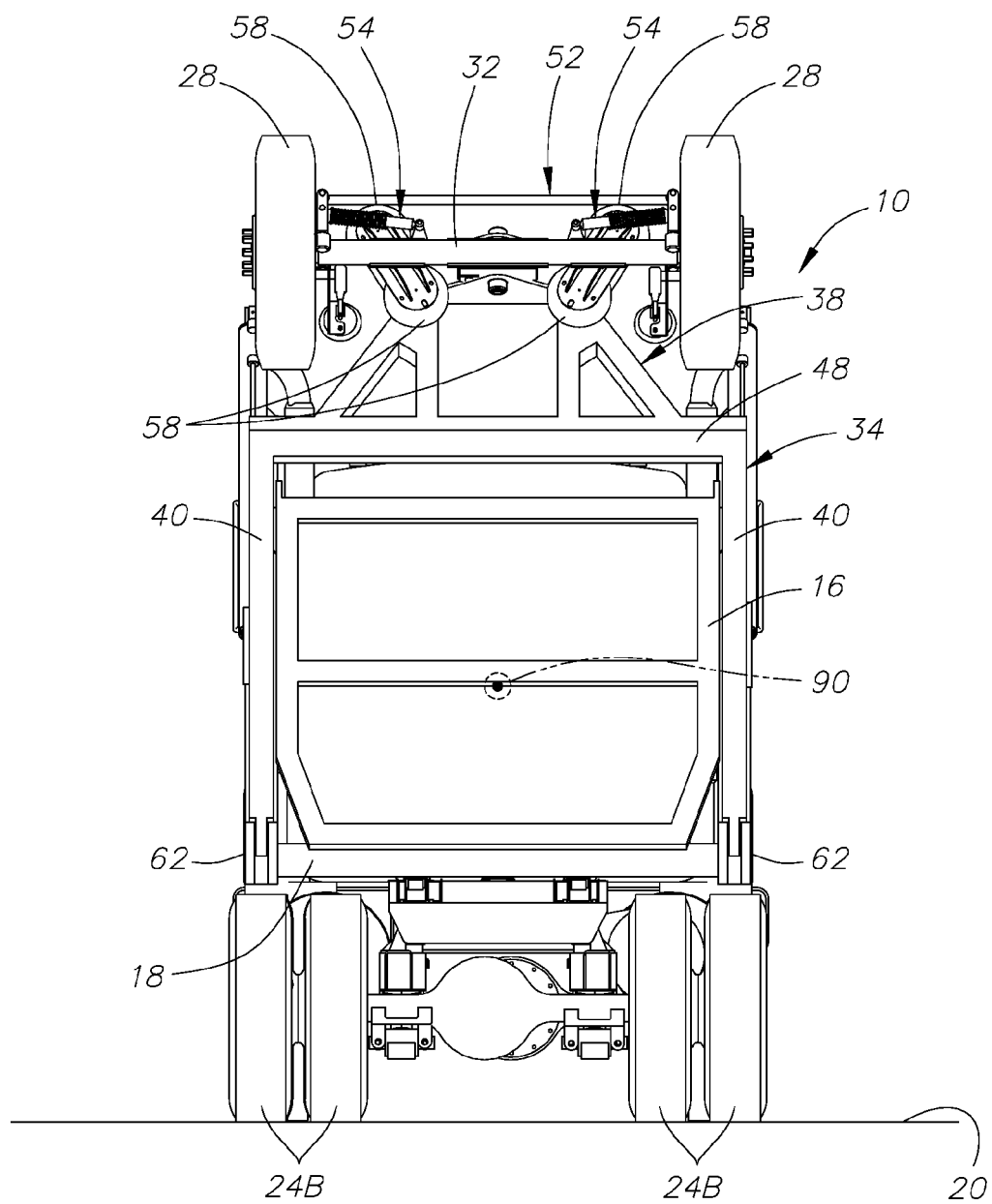
FIG. 2 is an enlarged view taken along the lines 2-2 in FIG. 1 when looking in the direction of the arrows.
Figure 3:
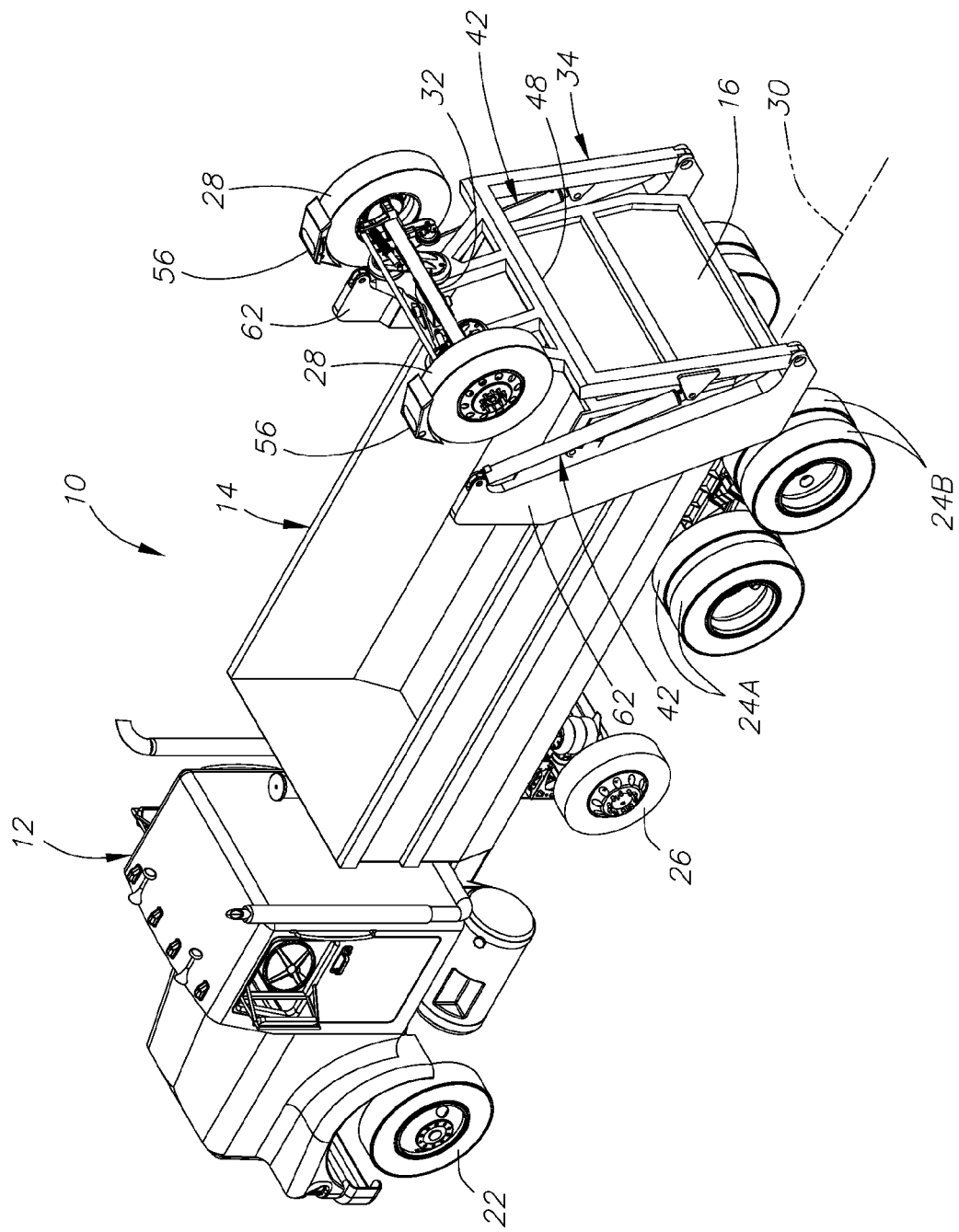
FIG. 3 is an isometric view of the truck as depicted in FIG. 1.
Figure 5:
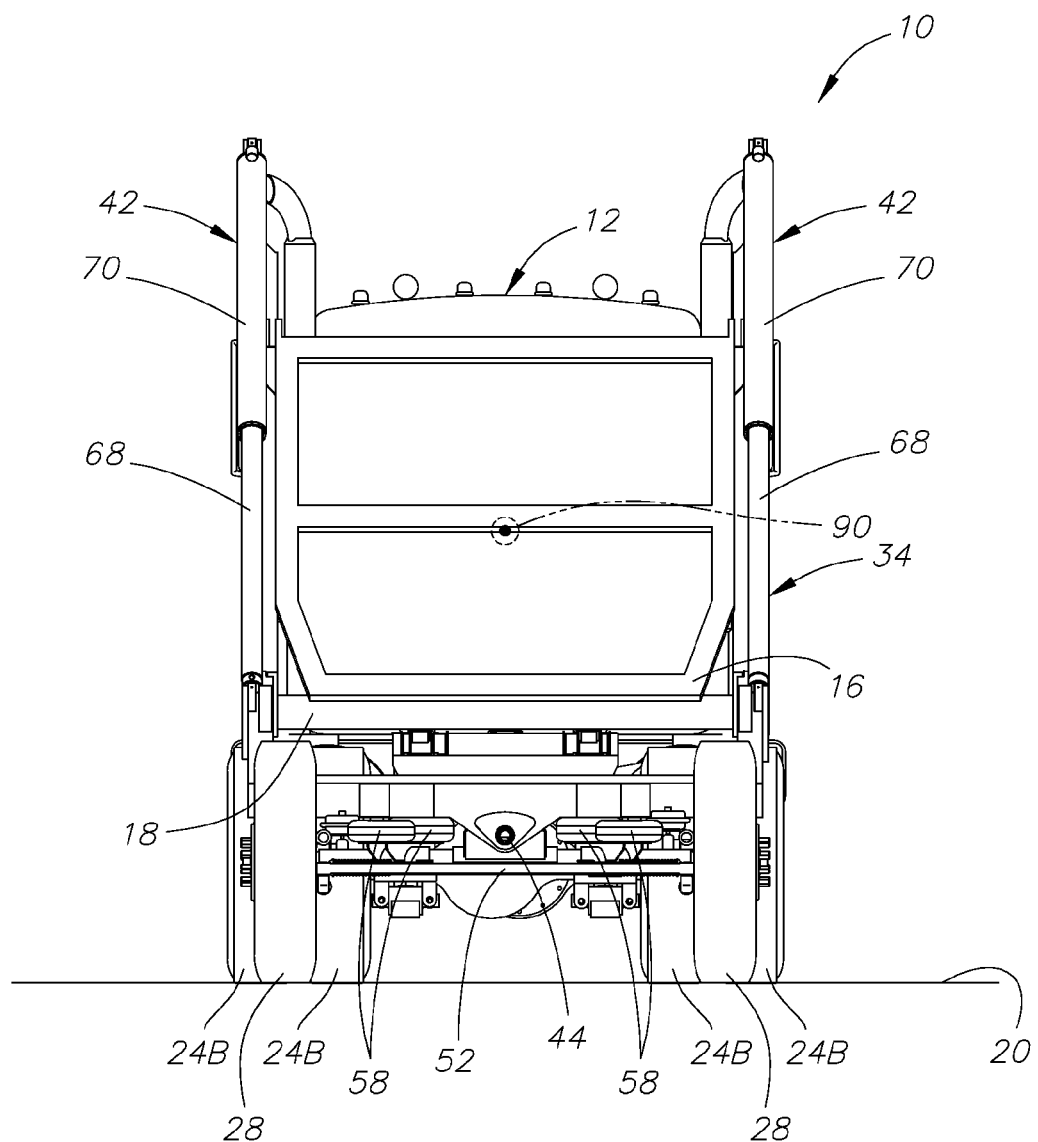
FIG. 5 is an enlarged view taken along the lines 5-5 in FIG. 4 when looking in the direction of the arrows.
Figure 6:
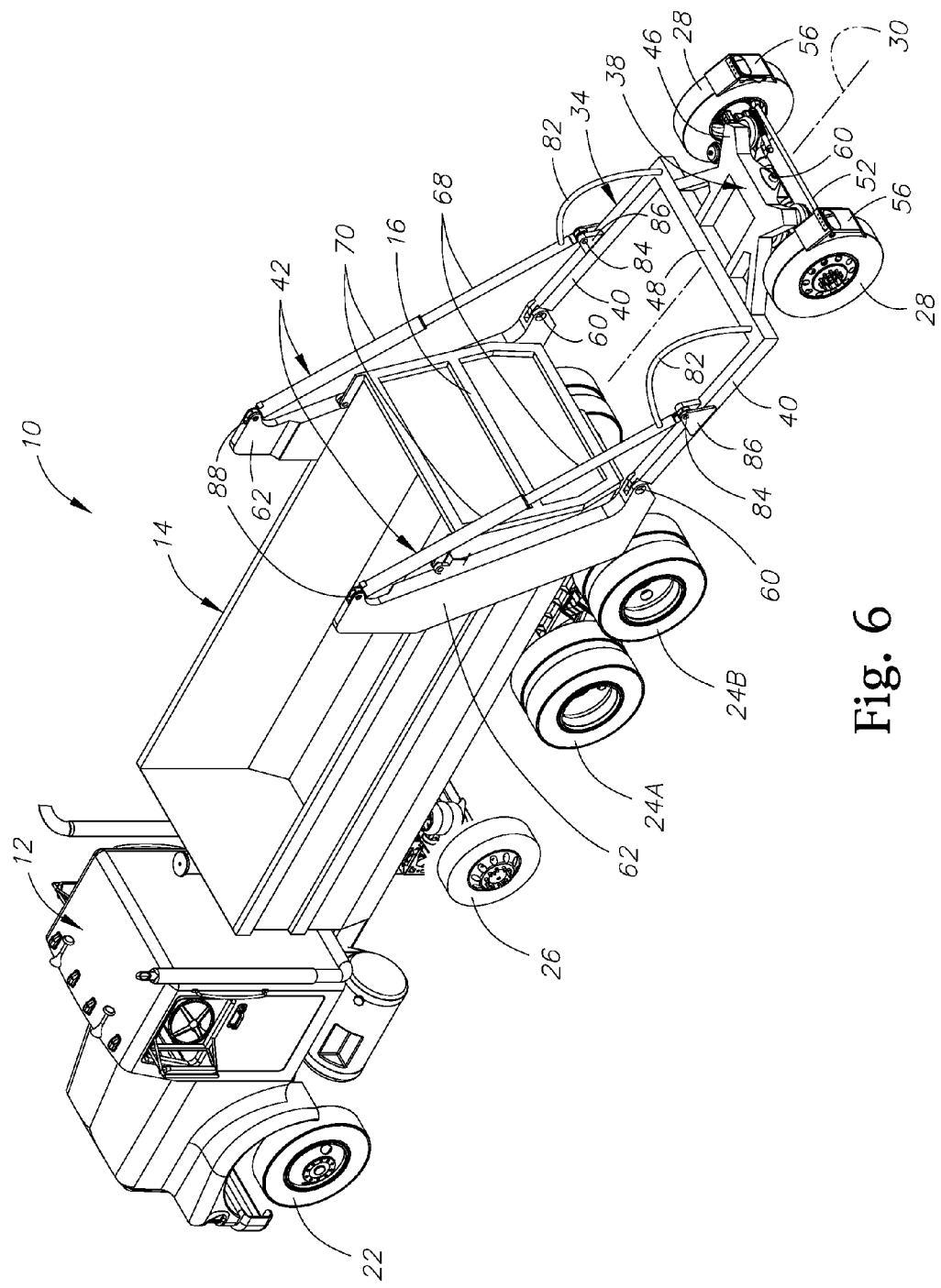
FIG. 6 is an isometric view of the truck as depicted in FIG. 4.
Figure 7:
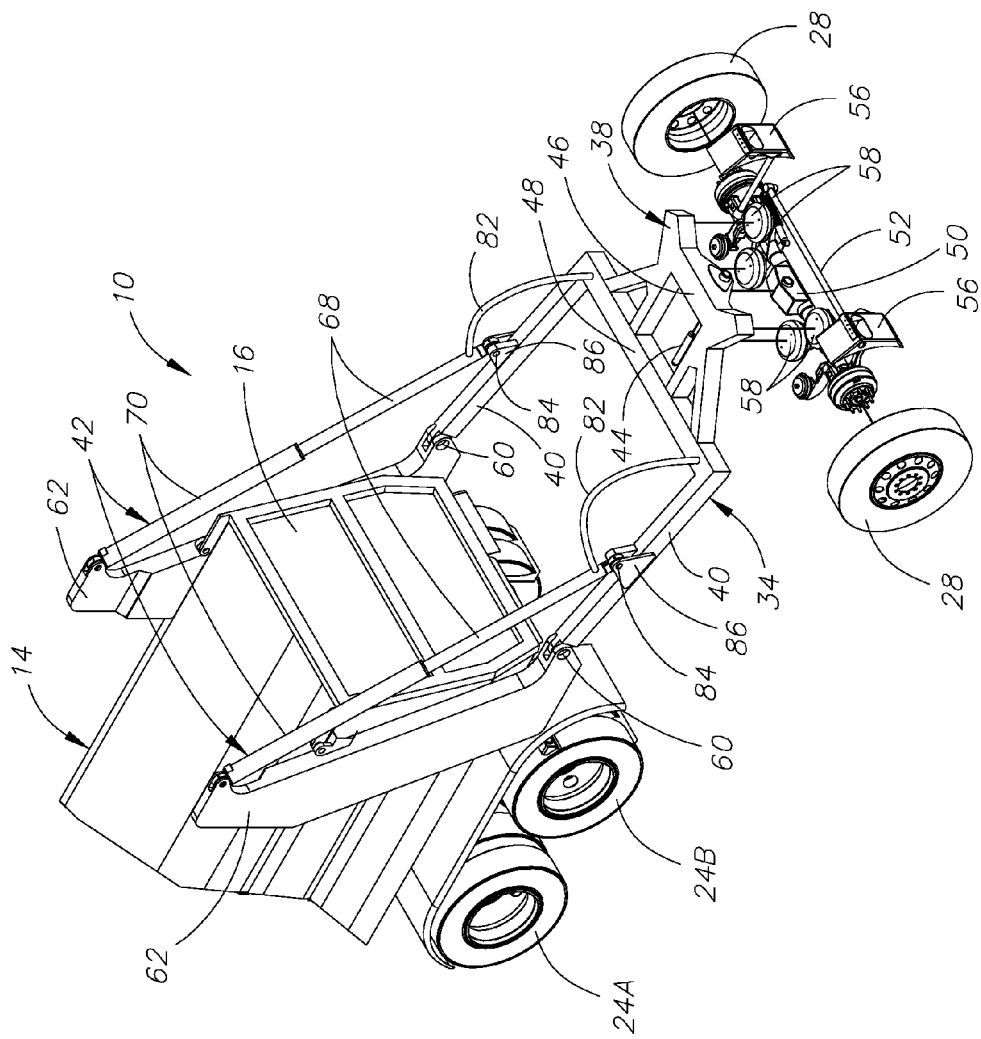
FIG. 7 is an enlarged isometric view of the trailing axle suspension system in its deployed active condition with parts of the trailing axle shown exploded.
Figure 8:
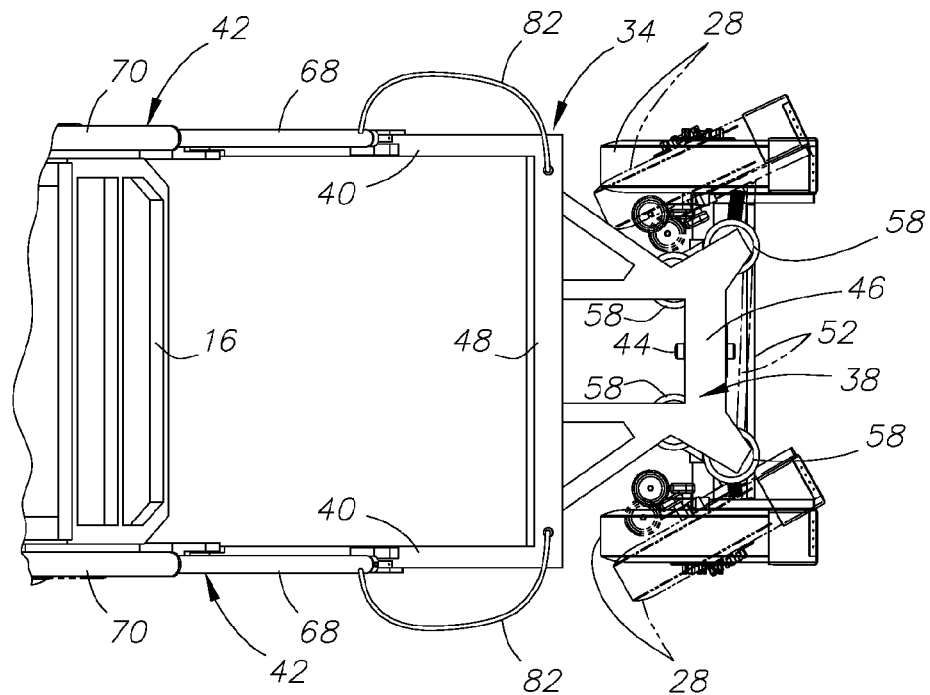
FIG. 8 is an enlarged view taken along the lines 8-8 in FIG. 4 when looking in the direction of the arrows and with the trailing axle's steerable wheels shown in solid lines in their normal neutral position and shown in phantom lines at one of their maximum steering angles and with the wheel fenders omitted.

Further describing the trailing axle suspension system 34, the suspension arms 40 form rigid integral portions of the carriage 38 which extend parallel to each other at locations outboard of the truck body and are pivotally connected at their distal end with a pivot pin 60 to the lower end of trailing axle anchoring crossmembers 62 that extend completely across the truck body 14 at a forward angle and are rigidly fixed to the outboard sides of the truck body. And wherein the anchoring crossmembers 62 are arranged in parallel relationship, angle forward in substantially parallel relationship with the rear end of the truck body and extend at their lower end beyond the rear of the truck body in providing for the pivotal connection of the carriage suspension arms 40. Whereby the carriage 38 and thus the trailing axle 32 is thereby adapted to pivot between a stowed condition on the truck body 14 as shown in FIGS. 1-3 and an active condition as shown in FIGS. 4-6. With the carriage 38 and trailing axle 32 in the stowed condition that is established with full retraction of the actuators 42 as further described later then at their maximum vertical extent. And with the fenders 56 then at but not extending above the highest extent allowed of the truck in meeting vehicle height restriction requirements. That for example in many states limit the vehicle height to 13 feet-4 inches and with the fenders 56 in the exemplary embodiment then being just below this maximum height.

On the other hand, the trailing axle 36 when established by the actuators 42 in the active condition is located at a substantial distance behind the vehicle with its wheels 28 then contacting with a road surface and the trailing axle being downwardly forced by the actuators 42 as further described later to help support the truck as well as extend its effective wheel base. For example, the trailing axle 32 in the exemplary embodiment is then located at about 13 feet-9 inches behind the center of the rear most driven wheels 24B and thereby significantly adds to the effective wheel base of the truck in meeting bridge restrictions.

Figure 23:
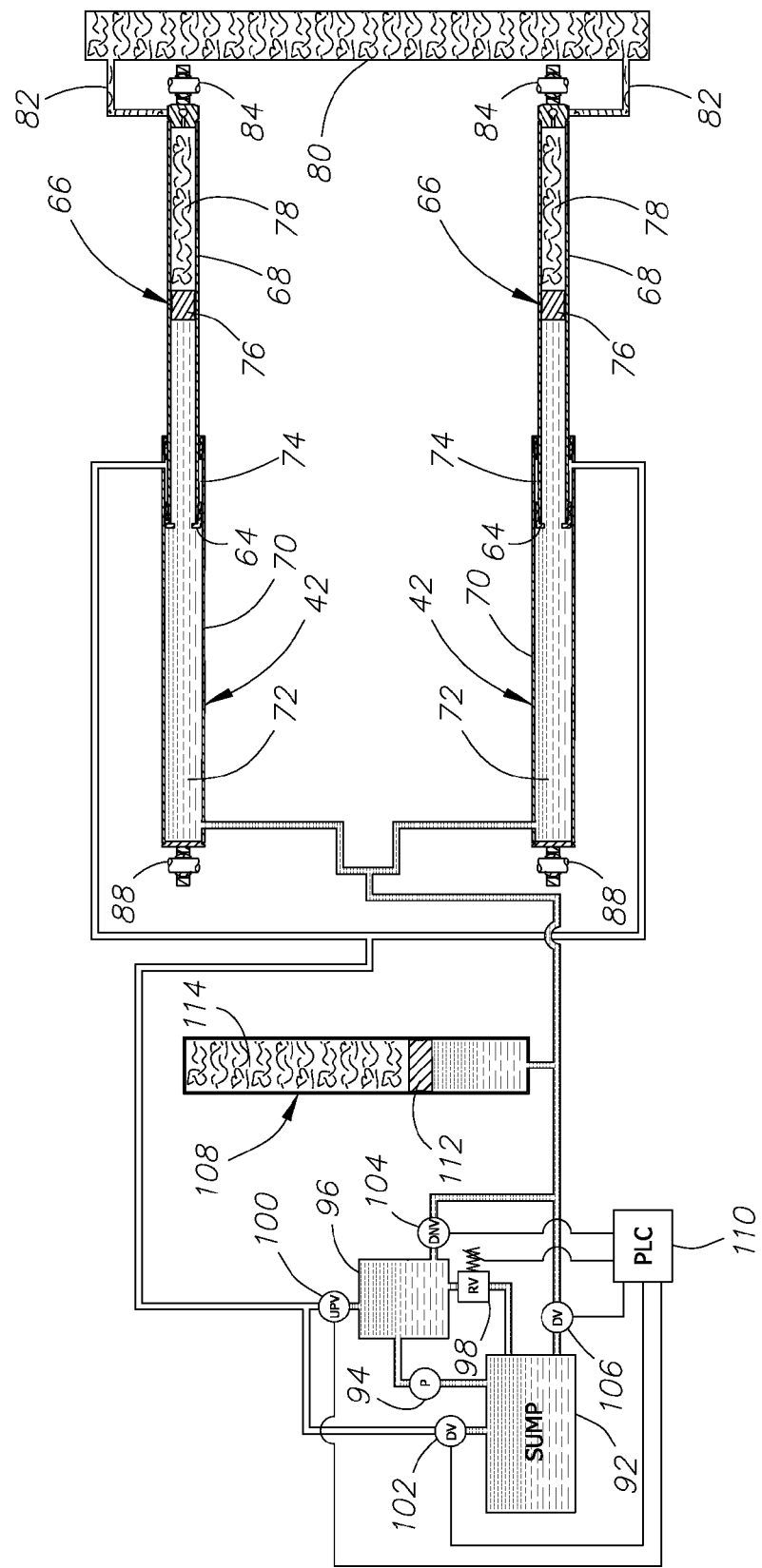
FIG. 23 is a schematic of the components associated with the operation of the actuators in the trailing axle suspension system.

Further describing the actuators 42 and with reference to FIG. 23, they comprise a hydraulically operated piston 64 of cylindrical annular shape and a hydraulically associated gas spring 66. Wherein the piston 64 has an integral piston rod 68, is received in a cylinder 70, and is operated by supplying hydraulic pressure to and exhausting hydraulic fluid from hydraulic chambers 72 and 74 at opposite ends of the piston. And wherein the gas spring 66 comprises a cylindrical piston 76 that is received in a cylinder formed by the piston rod 68, is exposed at one end to hydraulic pressure acting in the chamber 76 through the central opening in the piston 64, and is exposed at the opposite end that is of equal area to a gas chamber 78. To which a suitable gas under pressure is made available by an elongated cylindrical tank 80 that serves as a gas pressure accumulator, is mounted in the crossbeam 48, and is connected at opposite ends by flexible hoses 82 to the gas chamber 78 in the actuators. See FIGS. 6-9 and 23. And wherein the gas circuit of the actuators comprising their gas chamber 78 and the gas pressure accumulator 80 is charged in a static condition with a gas such as nitrogen that is free of water vapor and at a suitable pressure to support the actuator gas spring operation later described with the trailing axle 32 in its active load bearing condition.

Describing now the mounting of the actuators 42, they are arranged in parallel laterally-spaced relationship outboard of the truck body 14 and are pivotally connected at their opposite ends to the carriage 38 and truck body 14. With the actuators 42 pivotally connected at one end (the projecting end of their piston rod 68) by pivot pins 84 and anchoring brackets 86 to the respective carriage suspension arms 40 at a location intermediate their length. And with the actuators 42 pivotally connected at their opposite end (the closed end of their cylinder 70) by pivot pins 88 to the upper end of the respective tailgate anchoring crossmembers 62 where they extend a considerable distance above the top of the vehicle body 14.

The actuators 42 are thus arranged outboard of the tailgate 16 so as to not interfere with its opening and closing and are firmly pivotally connected with the vehicle frame 18 via the truck body 14 at laterally aligned locations that are above the vehicle body and at the highest possible elevation of the center of gravity of an added load which is indicated as occurring at approximately the location 90 in the exemplary embodiment with the maximum allowable load weight. Where it is situated midway of the length and a substantial distance above the center height of the truck body 14. And with the actuators 42 thus connected with the truck body 14 and thereby with the vehicle frame 18 to apply optimum resistance by the trailing axle suspension system 34 as further described later against forces tending to tilt the vehicle frame about its roll axis 30 that is determined by the setup of the front axle and driven axle suspension systems as earlier mentioned.

Figure 19:
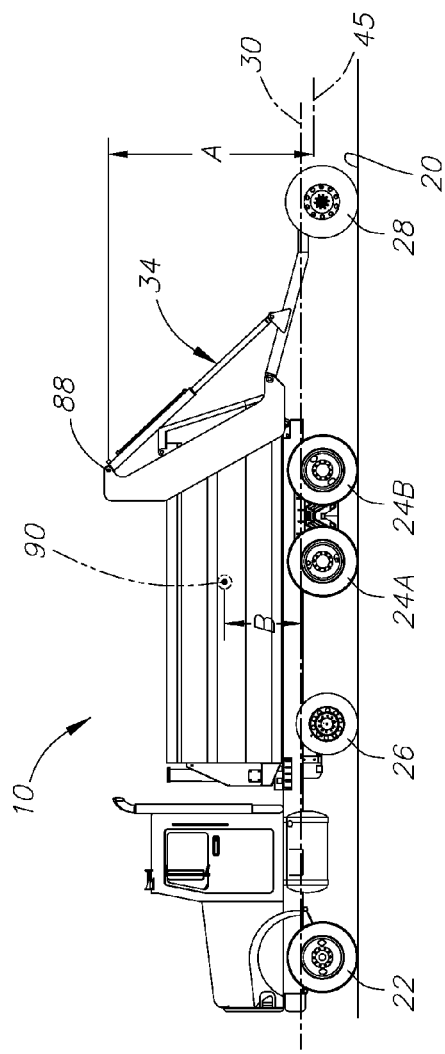
FIG. 19 is a side view like FIG. 4 with certain added height distances.

Describing now the overall arrangement of the trailing axle suspension system 34, the suspension arm pivot pins 60 are axially aligned as are the actuator pivot pins 84 and 88 with centerlines parallel to the axles of the front wheels 22, driven wheels 24A, 24B and pusher wheels 26 as established by their suspension systems. Whereby the carriage 38 and thereby the trailing axle 32 is supported in parallel relationship with the other axles supporting the vehicle frame and with the pivot axis of the trailing axle provided by its pivot pin 44 establishing the trailing axle with a roll axis 45 in substantially parallel relationship with the vehicle frame's roll axis 30 and thus for pivotal or tilting movement of the trailing axle in a plane at substantially right angles to the vehicle frame's roll axis when the trailing axle is in its active condition with the trailing axle and the primary axles of the vehicle on a level grade and in a plane that remains at right angles to the trailing axle pivot axis/roll axis and can intersect with the vehicle frame roll axis 30 in a common plane when the trailing axle experiences changes in road grade relative to the vehicle frame. See FIGS. 19 and 20. And the gas springs 58 that operate directly on the centrally pivoted trailing axle 32 with their spring action thus accept and accommodate only the lateral loads or forces acting to tilt the vehicle frame 18 about its roll axis 30 and thus assist the other axle suspension systems in resisting tilting vehicle frame motion in a cushioning manner to a degree that depending on the vehicle loading can be adjusted by the vehicle operator to provide for more tilting resistance by the trailing axle independent of the other axles by simply increasing the air pressure in the gas springs 58.

The direct acting trailing axle gas springs 58 that will also be referred to herein as carriage gas springs are arranged like the pusher axle gas springs at their factory recommended mean road height that is desired for normal spring life when the trailing axle is active. And unlike the pusher axle gas springs, the carriage gas springs 58 and in addition to having a significantly higher air pressure also have a significantly smaller spring compliance or stroke than the pusher axle gas springs and thereby contribute significantly in stabilizing the vehicle frame under lateral loading forcing it to tilt/roll about its roll axis 30 against the resisting force of the suspension systems of the axles which directly support the truck frame. And wherein the carriage gas springs 58 only need a relatively small stroke because of their close proximity to the trailing axle pivot pin 44 and thereby have the ability to allow proportionally greater trailing axle wheel amplitudes but not nearly to the extent of that allowed of the pusher axle wheels by their gas springs. And with the pivotal trailing axle 32 and carriage gas springs 58 thus contributing to a significant and vehicle operator adjustable degree in supporting lateral loading on the vehicle frame while having the cushioning ability to also efficiently accommodate bumps and depressions in a road surface encountered by either of the trailing axle wheels 28 to a satisfactory degree while also preventing transmittal of shock forces on the trailing axle wheels to the vehicle frame from occurrences such as when one or both of the trailing axle wheels encounter an abrupt bump or dip in the road surface.

Moreover, the actuators 42 in deploying the trailing axle 32 in its active condition and by virtue of their gas spring 66 also allow the trailing axle 32 to extend a significant distance both below road grade relative to the vehicle frame 18 as shown in FIGS. 13 and 14 and above grade as shown in FIGS. 15 and 16. For example, the actuators 42 in the exemplary embodiment allow the trailing axle 32 to travel about 20 inches both above and below road grade. With such trailing axle travel also being allowed in a cushioned manner when the trailing axle wheels 28 encounter bumps and dips in a road surface as shown in FIGS. 17 and 18, respectively.

In considering the enhanced vehicle roll stability provided by the present invention, it is helpful to understand that the front axle and driven axle suspension systems are adapted in a conventional manner to normally support the vehicle frame 18 at the front wheels 22 and drive wheels 24A, 24B in a ride-height relationship that is substantially parallel to a flat road surface as shown in FIG. 1 with and without a payload. Wherein the roll axis 30 remains generally in the position shown and with respect to which the vehicle frame and thus the cab 12 and truck body 14 can pitch and roll under control to a limited degree and can also possibly yaw but to a very limited degree such as when the truck is traveling at a high speed on a curved road. While on the other hand, the trailing axle suspension system 34 is not so limited in ability with regard to resisting tilting of the vehicle frame about its roll axis and its contribution to enhancing vehicle roll stability results from the strategic connection of the actuators 42 with the truck body at such an elevated location as compared to the other axle suspension systems that are suspended from the vehicle frame at relatively low locations.

Describing now the components associated with the operation of the trailing axle suspension system 34 and with reference to FIG. 23, they comprise a vented hydraulic reservoir/sump 92, a hydraulic pump (P) 94, a hydraulic pressure supply manifold 96, a controllable hydraulic pressure regulator valve (RV) 98, an Up Valve (UPV) 100 and associated Dump Valve (DV) 102, a Down Valve (DNV) 104 and associated Dump Valve (DV) 106, an optional gas spring 108, and a Programmable Logic Controller (PLC) 130. Wherein these components are operatively connected as shown and with the trailing axle suspension system actuators 42. And it will be understood that the PLC 110 is programmed to operate under the command of the vehicle operator in controlling the operation of the trailing axle suspension system 34 as will now be described.

The trailing axle suspension actuators 42 as depicted in FIG. 23 have been conditioned to establish the trailing axle 32 in its active condition to assist in supporting the truck. And in accomplishing this, the PLC 110 in response to a command by the vehicle operator has opened the Down Valve 104 and closed the associated Dump Valve 106, closed the Up Valve 100 and opened the associated Dump Valve 102 and while the pump 94 operates continuously in supplying hydraulic fluid under pressure from the sump 92 to the manifold 96 as well as other hydraulically operated components on the truck. At the manifold 96, the pressure of the hydraulic fluid is regulated by the regulator valve 98 that exhausts excess fluid back to the sump beyond that required to maintain the hydraulic pressure at a desired operating pressure that is determined by the PLC 110 according to the down force prescribed for the trailing axle 32 in assisting to help support the vehicle. And this may for example include an automated process that by controlling the down force on the trailing axle, the trailing axle is utilized to control the loading on all the axles to best advantage in supporting the truck according to its existing weight and which can change with the adding and discharging of a load. And whether this pressure is set for two different operating pressures (a relatively low pressure for little or no added load and a relatively high pressure to accommodate greater loads up to the maximum) or automatically controlled to vary in some manner over a wide range of operating pressure, the actuators 42 as depicted in FIG. 23 have resultantly extended to deploy and establish the trailing axle 32 in its active condition as shown in FIGS. 4-6 to help support the truck.

With this accomplished by the hydraulic pressure then being supplied to the actuator hydraulic chambers 72 while their other hydraulic chamber 74 is exhausted to the sump to thereby deploy and establish the trailing axle in the active condition where it is forced down ward by the hydraulic pressure on the actuator pistons 64 to the desired degree to help support the truck frame as well as extend the effective wheel base of the truck.

The actuator gas springs 66 because of the axial extent of the actuators 42 in being attached at such a high elevation to the truck body 14 require a gas spring compliance large enough to satisfy the wide range of trailing axle travel that is allowed while in the active condition as earlier described. While also providing a relatively soft suspension for the trailing axle 32 without significantly detracting from the roll stabilizing effect made available with the pivotal connection of the actuators with the upper end of the trailing axle anchoring columns 62.

And this is accomplished without the gas spring 108 by providing the gas pressure accumulator 80 with a volume sufficient in respect to the actuator gas springs 66 to accommodate the gas pressure reserve required to avoid fluctuating the gas and hydraulic pressure with the wide range of extension and retraction of the actuators 42 in accommodating the up and down trailing axle travel in the active condition as previously described. Or accomplishing the same desired effect with the addition of the gas spring 108 that operates in conjunction with the actuator gas springs 66 and allows the gas pressure accumulator 80 to then be of less volume than if it alone provided sufficient gas pressure reserve to provide for the up and down trailing axle travel in the active condition as previously described and prevention of gas and hydraulic pressure fluctuations.

The operating mechanism of the gas spring 108 is unlike that of the actuator gas springs 66 in being external of the actuators 42 and is for example mounted on the truck body where it can most conveniently connect with the actuators 42. And again referring to FIG. 23, the gas spring 108 comprises a cylindrical piston 112 having one end acted on by the hydraulic pressure delivered to the actuator hydraulic chambers 72 to deploy and establish the trailing axle 32 in the active condition and an opposite end of equal area acted on by the gas pressure in a chamber 114 that is charged with nitrogen like the gas accumulator 80 but has a significantly smaller static volume and is charged in its static condition at a significantly lower pressure. Whereby the gas chamber 114 serves as a low pressure accumulator and the gas pressure accumulator 80 then serves as a high pressure accumulator. With the low pressure gas accumulator 114 thereby providing for the gas spring action provided by the actuators 42 in accommodating up and down trailing axle travel with actuator extension and retraction without resulting hydraulic pressure fluctuations at relatively low hydraulic operating pressures when the trailing axle is playing a relatively minor role in helping to support the vehicle. And the high pressure gas accumulator 80 at relatively high hydraulic operating pressures beyond the pressure range of the low pressure gas accumulator then providing for the actuator gas spring action on the trailing axle in allowing the actuators to extend and retract to the same extent in accommodating the up and down trailing axle travel permitted without fluctuating the acting gas and hydraulic pressure when the trailing axle is playing a relatively major role in supporting the vehicle.

Having described the establishing of the trailing axle 32 in its active condition wherein the contribution to vehicle roll stability by the trailing axle suspension system 34 will be further described later, the trailing axle is established in its stowed condition by the PLC 110 on vehicle operator command by closing the Down Valve 104 and opening the associated Dump Valve 106, and opening the Up Valve 110 and closing the associated Dump Valve 102. Whereby the actuators 42 then retract and lift the trailing axle 32 to its stowed condition with the hydraulic pressure then being supplied from the manifold 96 to the actuator hydraulic chambers 74 with their other hydraulic chamber 72 then exhausted to the sump and the actuators thereby eventually fully retracted in establishing the stowed condition.

Having described the overall arrangement of the truck's suspension layout and the operation of the trailing axle in helping to support the vehicle, it will thus be appreciated that the actuators 42 are adapted to establish the axle in the stowed condition and active condition with hydraulically forced piston movement. Wherein in the active condition (a) the trailing axle 32 is forced by the hydraulically operated actuator pistons 64 to assist in supporting the vehicle frame 18 though the action of the actuator gas springs 66 alone or with the optional gas spring 108, (b) the actuator gas springs 66 alone or with the optional gas spring 108 allow a prescribed range of movement of the trailing axle relative to the vehicle frame in reaction to road grade changes at the steerable trailing axle wheels 28 and without significantly fluctuating the gas and hydraulic pressure and especially on encountering bumps and dips in a road surface that could adversely affect vehicle roll stability, (c) the carriage gas springs 58 and the actuator gas springs 66 alone or with the optional gas spring 108 effectively prevent shock forces on the steerable trailing axle wheels from being transmitted to the tailgate and thus to the truck frame, and (d) the carriage gas springs 58 and the actuators 42 with the actuator gas springs 66 alone or with the gas spring 108 resist movement of the vehicle frame 18 about its roll axis 30 at the pivotal connections of the actuators 42 with the vehicle body 14 at a location at least above the highest possible center of gravity of the maximum allowable load weight where it is most effective in countering forces tending to tilt the vehicle frame about its roll axis.

Figure 24:
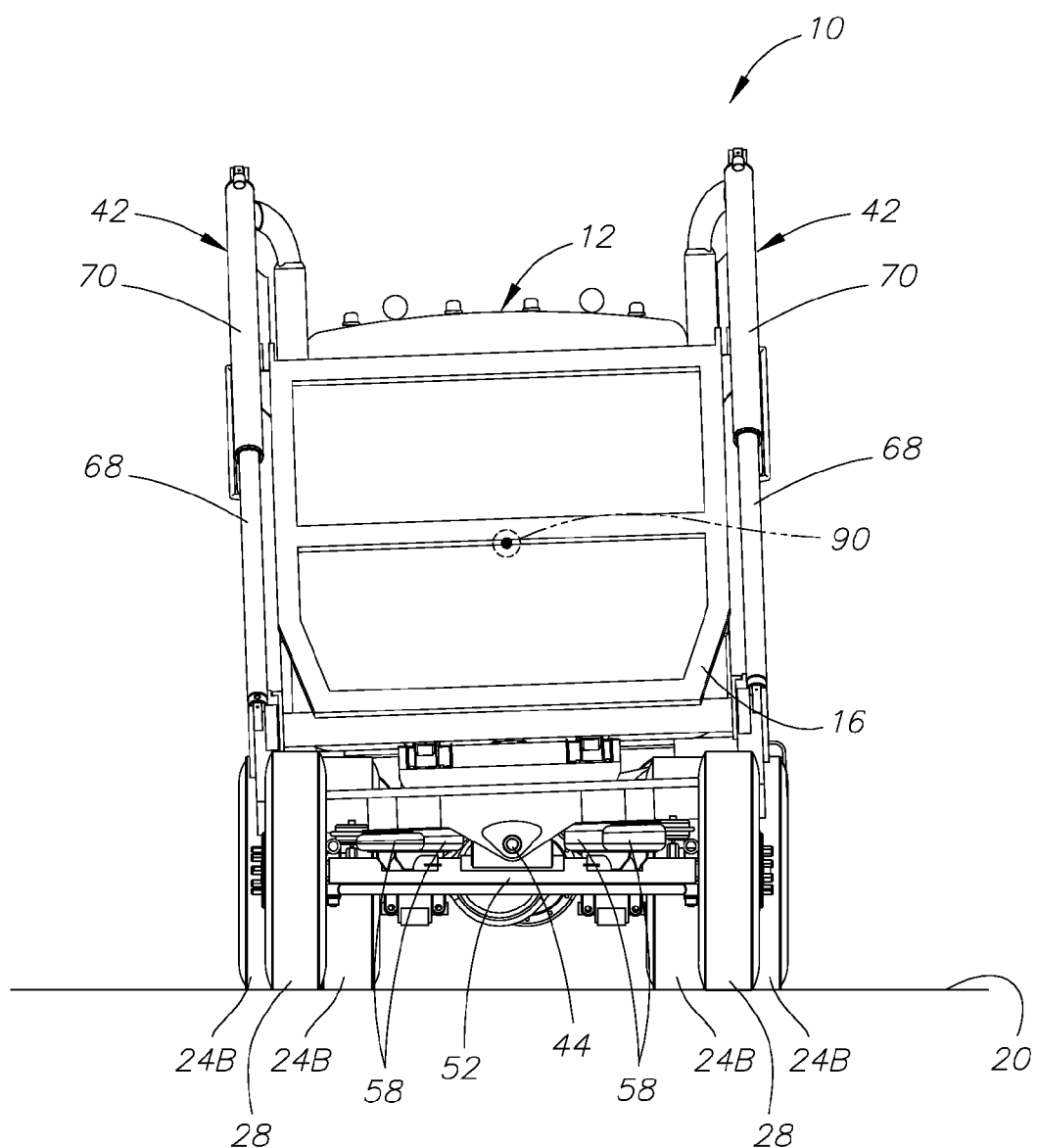
FIG. 24 is a view like FIG. 11 but with the trailing axle wheels fenders omitted and truck frame being forced to tilt about its roll axis in the counter-clockwise direction because of centripetal force acting on the truck in the direction indicated.

Moreover, it was recognized that such roll stability action increases in effectiveness to a maximum when the pivotal connections of the actuators 42 with the vehicle body 14 are located as high as road height restrictions permit as implemented in the exemplary embodiment. Wherein these connections are located high above the vehicle body 14 but still below a typical road height restriction and thus at a maximum distance above the highest possible center of gravity of the maximum allowable load weight that occurs at approximately the location 90 in the exemplary embodiment. With the connection of the actuators 42 with the vehicle body 14 thus at the highest elevation available to counter for example centripetal forces of a magnitude forcing the tilting of the vehicle frame 18 about its roll axis as shown in FIG. 24 and with the present invention serving to provide for such stabilizing action by the trailing axle suspension in a highly effective manner in so limiting the extent of the rolling action.

As it was recognized in analyzing the potential contribution of a trailing axle to vehicle roll stability when suspending the axle from the vehicle body that a significant contribution in providing for a counter-acting/balancing force occurs is obtained when this reactionary force is applied by the trailing axle actuators to the vehicle body at locations at least above the highest possible elevation of the center of gravity of the maximum allowable load weight where it is most effective to counter tilting forces on the vehicle frame such as when the vehicle is executing a curve at speed, experiencing high crosswinds and making a quick change in direction even at a relatively low speed. And this is taken full advantage of in the exemplary embodiment with the actuators 42 that are of relatively long extent compared to actuators with or without a gas spring that are normally used to operate a trailing axle with steerable wheels suspended from the vehicle body and without regard to enhancing the effect of the actuators with respect to vehicle roll stability extent. Whereas the actuators 42 in their implementation are specifically directed to enhancing vehicle roll stability and to the fullest extent possible in the exemplary embodiment as allowed by road height restrictions.

Figure 22:
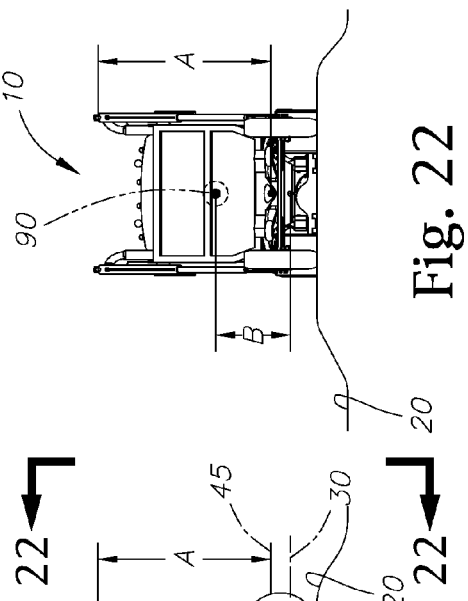
FIG. 22 is a view taken along the lines 22-22 in FIG. 21 when looking in the direction of the arrows.
Figure 21:
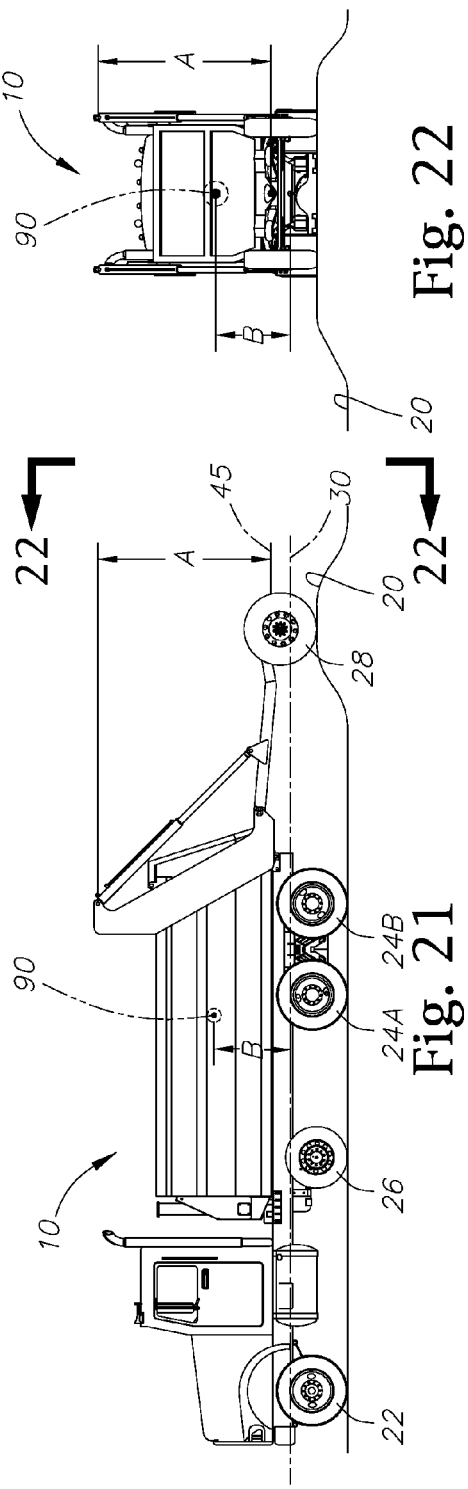
FIG. 21 is view like FIG. 19 but showing the trailing axle wheels encountering a bump.

While recognizing in analyzing the roll forces that are acting and with reference to FIGS. 19-22 that such beneficial results are obtained by having the pivotal connections 88 of the actuators 42 with the vehicle body 14 located so that the minimum possible distance A in height between the roll axis 45 of the trailing axle established by the pivot pin 44 and the pivotal connections 88 is always greater than the maximum distance B in height between the roll axis 30 of the vehicle frame and the center of gravity 90 of the maximum allowed load supported by the vehicle body. With this being illustrated in FIGS. 19 and 20 with the truck wheels and trailing axle wheels on a level road surface and then with the trailing axle wheels encountering a 20 inch high bump as illustrated in FIGS. 21 and 22. And with it being understood that in the exemplary embodiment the enhanced roll stability of the truck frame provided by the trailing axle suspension system 34 has been maximized to the extent permitted by road height restrictions and in that it was found that significantly enhanced roll stability will occur as long these parameters are followed in pivotally connecting the actuators to the vehicle body at other elevated locations.

Moreover and with respect to the trailing axle stowed condition that is provided, it will be appreciated that the trailing axle carriage 38 and the trailing axle 32 are then located completely clear of the top of the vehicle body 14. And thereby allows the vehicle body to be loaded in the normal manner.

It will also be appreciated that having disclosed an exemplary embodiment of the invention, persons skilled in the art may arrive at various versions or modified forms of the invention constituting other embodiments including other suspension arrangements for suspending the trailing axle from the carriage and as adapted to other types of motor vehicles having a load-carrying body and is adapted to carry a load whose center of gravity can vary in elevation on the vehicle to a significant degree during vehicle usage. And therefore, the scope of the invention is intended to be limited only by the scope of the appended claims.

The invention claimed is:

1. A trailing axle suspension system for suspending a trailing axle with steerable wheels from a motor vehicle having a vehicle frame that is normally supported by primary axles with wheels and in turn supports a vehicle body with a tailgate wherein the vehicle frame is supported by the primary axles for rolling movement relative to a vehicle frame roll axis, and the maximum allowed load supported by the vehicle body has a center of gravity located below the vertical height of the vehicle body and at or substantially above the vertical midheight thereof, said suspension system comprising a carriage from which the trailing axle is directly suspended wherein the carriage is pivotally connected to the vehicle body at locations outboard thereof and is adapted to locate the trailing axle in a stowed condition on the vehicle and in an active condition wherein the trailing axle is located at a substantial distance behind the vehicle with the steerable wheels engaging a road surface and the trailing axle is supported by the carriage for rolling movement relative to a trailing axle roll axis, a pair of hydraulically operated actuators pivotally connected at one end to the carriage and pivotally connected at an opposite end to the vehicle body adapted to establish the trailing axle in the stowed condition and in the active condition wherein the actuators apply force on the trailing axle to help support the vehicle frame, gas springs adapted with the trailing axle in the active condition to allow a prescribed range of swinging movement of the trailing axle relative to the vehicle frame to accommodate differences in road grade between the trailing axle wheels and the wheels of the primary axles, and the pivotal connections of the actuators with the vehicle body located forward of the tailgate and at a vertical height substantially above the center of gravity of the maximum allowed load supported by the vehicle body so that the minimum possible distance in height between the trailing axle roll axis and the pivotal connections of the actuators with the vehicle body is always greater than the maximum distance in height between the roll axis of the vehicle frame and the center of gravity of the maximum allowed load supported by the vehicle body within the prescribed range of trailing axle swinging movement allowed by the gas springs.

2. A suspension system as set forth in claim 1 wherein the actuators are pivotally connected to the vehicle body at locations above the vehicle body.

3. A suspension system as set forth in claim 1 wherein the actuators are pivotally connected to the vehicle body at locations above the vehicle body and forward of the pivotal connections of the carriage with the vehicle body.

4. A suspension system as set forth in claim 1 wherein the trailing axle in the stowed condition is located at an elevation above the tailgate.

5. A suspension system as set forth in claim 1 wherein the trailing axle in the stowed condition is located forward of the pivotal connections of the carriage with the vehicle body.

6. A suspension system as set forth in claim 1 wherein the primary axles include a pair of drive axles, and the pivotal connections of the actuators with the vehicle body are located above the rearmost drive axle.

7. A suspension system as set forth in claim 1 wherein the trailing axle is pivotally mounted at a central location on the carriage, and cushioning between the carriage and the trailing axle is provided by carriage gas springs arranged between the carriage and trailing axle on opposite sides of the pivotal mounting of the trailing axle.

8. A suspension system as set forth in claim 1 wherein the trailing axle is pivotally mounted at a central location on the carriage, and cushioning between the carriage and trailing axle is provided by four carriage gas springs arranged in pairs between the carriage and trailing axle on opposite sides of the pivotal mounting of the trailing axle.

9. A suspension system as set forth in claim 1 wherein the carriage is pivotally connected to the vehicle body at locations rearward of the vehicle body, and the actuators are pivotally connected to the vehicle body at locations forward of the pivotal connections of the carriage with the vehicle body.

10. A suspension system as set forth in claim 1 wherein the actuators and the carriage are pivotally connected to the vehicle body by parallel arranged anchoring crossmembers extending across and fixed to outboard sides of the vehicle body, and
the carriage is pivotally connected to a lower end of the crossmembers and the actuators are pivotally connected to an upper end of the crossmembers.

11. A suspension system as set forth in claim 1 wherein the actuators and the carriage are pivotally connected to the vehicle body by parallel arranged anchoring crossmembers extending across and fixed to outboard sides of the vehicle body and having an upper end that extends above the vehicle body and a lower end that extends past a rear end of the vehicle body, and
the carriage is pivotally connected to the lower end of the crossmembers and the actuators are pivotally connected to the upper end of the crossmembers.

12. A suspension system as set forth in claim 1 wherein the gas springs are adapted to operate with the hydraulic pressure operating the actuators in applying force on the trailing axle while allowing the actuators to extend and retract in accommodating differences in road grade between the trailing axle wheels and the wheels of the primary axles.

13. A suspension system as set forth in claim 1 wherein the vehicle body has an open top by which a load is added, and
the actuators are pivotally connected to the vehicle body at a substantial distance above the open top.

14. A suspension system as set forth in claim 1 wherein the primary axles include a pair of drive axles, and the pivotal connections of the actuators with the vehicle body are located above the rearmost drive axle and forward of the pivotal connections of the carriage with the vehicle body.

15. A suspension system as set forth in claim 1 wherein the trailing axle is pivotally mounted at a central location on the carriage with the trailing axle roll axis in substantially parallel relationship with the vehicle frame roll axis when the trailing axle is in the active condition and experiencing no substantial difference in road grade between the trailing axle wheels and the wheels of the primary axles.

16. A suspension system as set forth in claim 1 wherein the trailing axle is suspended from the carriage so as to prevent the trailing axle from movement relative to the carriage in accommodating differences in road grade between the trailing axle wheels and the wheels of the primary axles, and
the gas springs are adapted to operate with the hydraulic pressure operating the actuators in applying force on the axle while allowing the actuators to extend and retract in accommodating differences in road grade between the trailing axle wheels and the wheels of the primary axles.

17. A suspension system as set forth in claim 1 wherein the gas springs are adapted to operate with the hydraulic pressure operating the actuators in applying force on the trailing axle while allowing the actuators to extend and retract in accommodating differences in road grade between the trailing axle wheels and the wheels of the primary axles, and
cushioning between the carriage and trailing axle is provided by carriage gas springs arranged between the carriage and trailing axle having a spring compliance substantially less than the aforesaid gas springs.

18. A suspension system as set forth in claim 1 wherein the gas springs are adapted to operate with the hydraulic pressure operating the actuators in applying force on the trailing axle while allowing the actuators to extend and retract in accommodating differences in road grade between the trailing axle wheels and the wheels of the primary axles,
the trailing axle is pivotally mounted at a central location on the carriage, and
cushioning between the carriage and trailing axle is provided by carriage gas springs that are arranged between the carriage and trailing axle on opposite sides of the pivotal mounting of the trailing axle and have a spring compliance substantially less than the aforesaid gas springs.

19. A suspension system as set forth in claim 1 wherein the gas springs are adapted to operate with the hydraulic pressure operating the actuators in applying force on the carriage and thereby on the trailing axle while allowing the actuators to extend and retract independent of other spring action in accommodating differences in road grade between the trailing axle wheels and the wheels of the primary axles throughout the operating pressure range.

20. A suspension system as set forth in claim 1 wherein the gas springs together with an additional gas spring operate with the hydraulic pressure operating the actuators in applying force on the axle while allowing the actuators to extend and retract in accommodating differences in road grade between the trailing axle wheels and the wheels of the primary axles throughout the operating pressure range.

* * * * *